(12) United States Patent
Zhao

(10) Patent No.: US 7,496,286 B2
(45) Date of Patent: Feb. 24, 2009

(54) DEVICES, SYSTEMS, AND METHODS FOR CONTROLLING A SHUTTER

(75) Inventor: Yang Zhao, Andover, MA (US)

(73) Assignee: Memsic, Inc., N. Andover, MA (US)

( * ) Notice: Subject to any disclaimer, the term of this patent is extended or adjusted under 35 U.S.C. 154(b) by 380 days.

(21) Appl. No.: 11/446,810

(22) Filed: Jun. 5, 2006

(65) Prior Publication Data
US 2007/0280659 A1 Dec. 6, 2007

(51) Int. Cl.
G03B 17/00 (2006.01)
(52) U.S. Cl. .................... 396/53; 396/169; 396/247; 396/452; 348/208.5; 348/296; 348/367
(58) Field of Classification Search ............... 396/53, 396/125, 126, 169, 187, 247, 452; 359/554–557; 348/208.5, 296, 367
See application file for complete search history.

(56) References Cited

U.S. PATENT DOCUMENTS

| 5,640,617 | A * | 6/1997 | Bittner | 396/90 |
| 6,332,060 | B1 | 12/2001 | Miyamoto et al. | 396/55 |
| 6,470,147 | B1 | 10/2002 | Imada | 396/55 |
| 6,707,991 | B2 | 3/2004 | Mizumura | 396/55 |
| 6,796,729 | B2 * | 9/2004 | Mizukami et al. | 396/497 |
| 6,970,095 | B1 * | 11/2005 | Lee et al. | 340/669 |
| 6,992,700 | B1 * | 1/2006 | Sato et al. | 348/208.2 |
| 7,064,777 | B2 * | 6/2006 | Yamazaki | 348/208.5 |
| 7,400,825 | B2 * | 7/2008 | Takeuchi et al. | 396/90 |
| 2006/0104620 | A1 * | 5/2006 | Ebato | 396/55 |

FOREIGN PATENT DOCUMENTS

| JP | 11024122 A | * | 1/1999 |
| JP | 2006308841 A | * | 11/2006 |

OTHER PUBLICATIONS

JP11-024122 raw machine translation.*
JP2006-308841 raw machine translation.*

* cited by examiner

Primary Examiner—W. B. Perkey
Assistant Examiner—Linda B Smith
(74) Attorney, Agent, or Firm—Weingarten, Schurgin, Gagnebin & Lebovici LLP

(57) ABSTRACT

Devices, systems, and methods for controlling a shutter of a still or video camera or cellular telephone, to reduce blurring due to motion of vibrations are disclosed. The control device includes an inertial sensor for measuring acceleration, velocity and/or angular rotation and for providing data therefrom and a controller for calculating an acceleration amplitude and frequency for predicting the time between acceleration maximums. The controller opens and closes the camera shutter at a time corresponding to the predicted time between maximum accelerations as measured from a real-time acceleration maximum, negating the need for post-imaging correction.

20 Claims, 2 Drawing Sheets

DEVICES, SYSTEMS, AND METHODS FOR CONTROLLING A SHUTTER

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

1. Field of the Invention

Devices, systems, and methods for controlling a shutter to reduce blurring due to vibrations are disclosed.

2. Description of the Related Art

Optical and imaging systems such as cameras, video cameras, cell phones, and the like project the image of an object onto a focal plane where, when the shutter of the optical or imaging system is activated, the image is recorded on film or digitally. To improve the sharpness of the recorded image, some form of motion or vibration compensation can be implemented to compensate for any blurring that may result from undesirable movement of the optical or imaging system, e.g., due to vibrations.

Some conventional motion and/or vibration compensation devices involve measuring one or more parameters, e.g., angular velocity, with respect to time and, based on the measurements, performing time or phase shifting of the image or applying a correction value to the image. For example, U.S. Pat. No. 6,707,991 discloses an image shake-preventing apparatus that measures angular velocity to determine the change in angular velocity with time. When the change in angular velocity is zero, there is no motion with the object or with the optical or imaging system and no correction is required. However, when the change in angular velocity is other than zero, the frequency range for correcting the motion due to vibration can be changed using phase shifting.

U.S. Pat. No. 6,034,723 discloses an image movement vector detection apparatus that detects a vibration vector from the image signal, which may result from vibration of the camera, and an image movement vector, which represents movement of an object within the image signal of the object. According to the '723 patent, digitized luminance data from the image signal and the vibration vector output signal are used to detect the image movement vector.

These systems, however, require extensive memory and complex software, which add to the size and cost of the optical or imaging system. They also correct the image signal after it has been taken, rather, than finding an optimal time for taking an image of an object. Therefore, it would be desirable to provide devices, systems, and methods for controlling shutters of optical and imaging systems before an image is received, to negate the need for post-imaging correction.

BRIEF SUMMARY OF THE INVENTION

In accordance with the present invention, devices, systems, and methods for controlling opening and closing a shutter of an optical or imaging device, e.g., a still camera, a video camera, a cell phone, and the like, are disclosed. In one aspect, the control device comprises an inertial sensor, e.g., a two- or three-dimensional accelerometer, a gyroscope, a magnetic compass, and the like, and a controller. The inertial sensor continuously measures, for example, linear acceleration, rotational velocity, an absolute angle of rotation, and the like, from which signal data about the movement of the optical or imaging device can be transmitted to the controller. The controller calculates, for example, an acceleration amplitude and an acceleration frequency from acceleration waveform data from an accelerometer. Preferably, motion or vibration is sensed in the plane of the image sensor of the imaging device, such as the film plane of a film camera or the solid state sensor of a digital camera.

Using frequency data from the acceleration waveform data, the controller can predict a time between peak accelerations. As a result, the controller can open and close the shutter at an optimal time for controlling blurring, i.e., at a time corresponding to the predicted time between peak accelerations as measured from a real-time acceleration amplitude maximum.

In another aspect, the present invention also provides a method for providing high-quality images from an optical or imaging device. The method comprising providing an optical or imaging device with an inertial sensor; calculating an acceleration amplitude and an acceleration frequency from the acceleration waveform data; predicting a time between peak accelerations from the acceleration waveform data; and opening and closing the shutter after the shutter release has been activated at a time corresponding to the predicted time between peak accelerations as measured from a real-time acceleration amplitude maximum.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
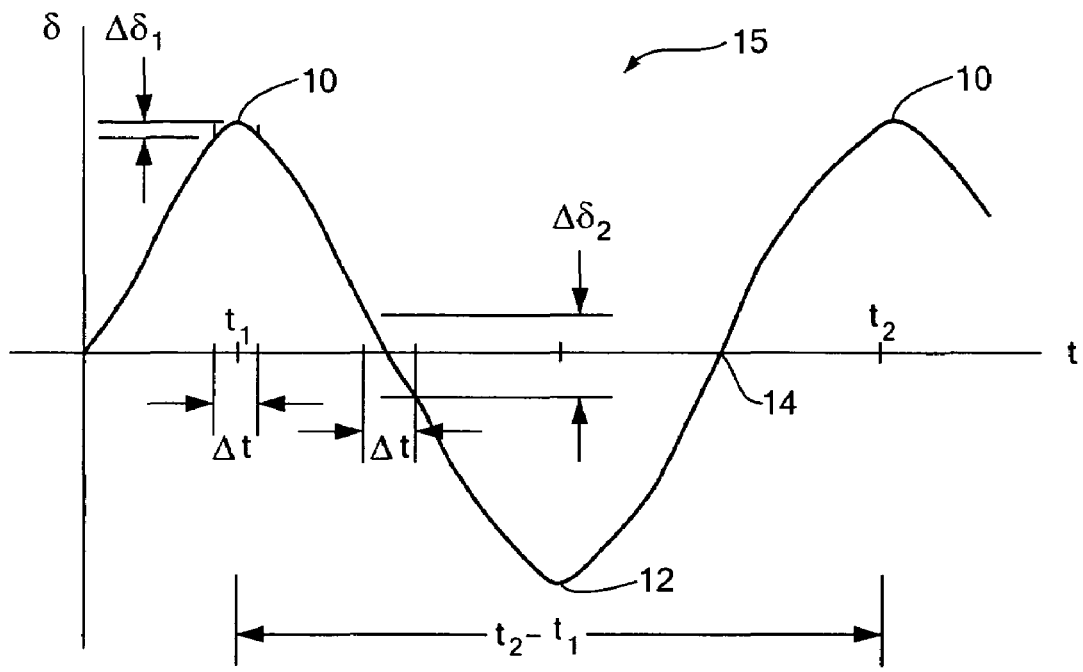
FIG. 1 shows a sinusoidal displacement waveform.

Disclosed is a shutter control device for an optical system or an imaging system that improves image sharpness by reducing blurring resulting from vibrations, e.g., hand vibrations. Referring to FIG. 1, as a rule, vibrations, i.e., displacement ($\delta$) over time (t), are sinusoidal in all three-dimensions. At and near the peaks 10 and troughs 12 of the sinusoidal waveform 15, the slope of the sinusoidal waveform 15, i.e., the change in displacement with respect to a very short period of time ($\Delta\delta_1/\Delta t$), is substantially zero. In contrast, at or near a point of zero displacement 14, i.e., where $\delta=0$, the change in displacement with respect to the same short period of time ($\Delta\delta_2/\Delta t$) is more significant. Accordingly, very near or at the peaks 10 or troughs 12 of the vibration sinusoid 15 there is substantially no relative-movement due to vibrations, whereas near the points of zero displacement, vibrations are at a maximum.

Figure 2:
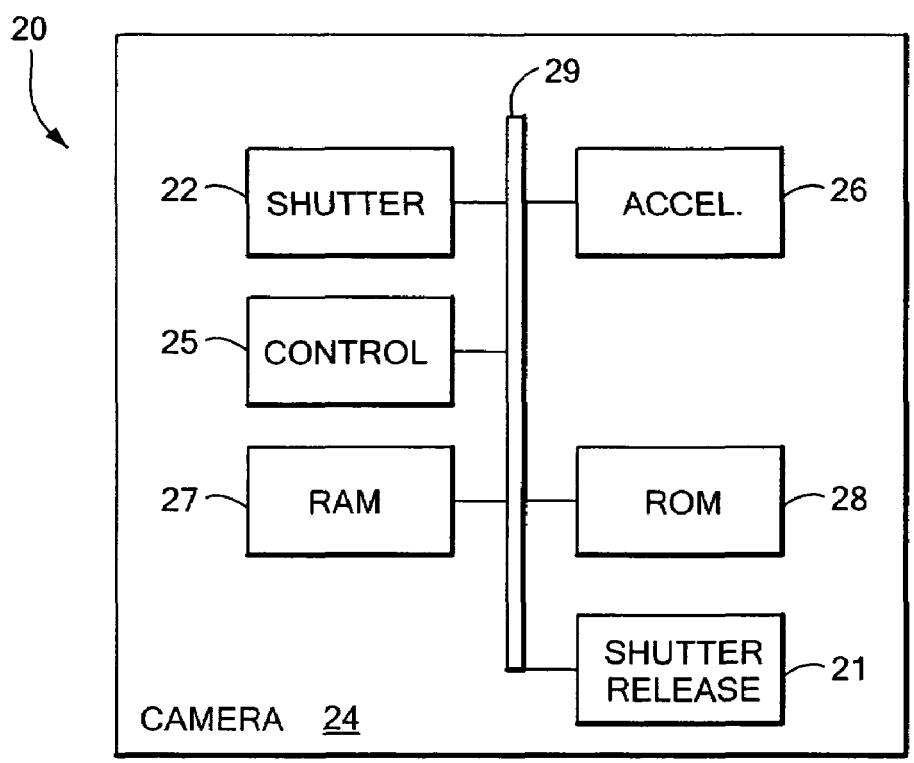
FIG. 2 shows a block diagram of an optical or imaging system with a shutter controlling device in accordance with the present invention.

Referring to FIG. 2, a system 20 for controlling the instant of opening and closing a shutter 22 of an optical or imaging device or system 24, e.g., a still or video camera, a cell phone, and the like, is shown in block diagram form. The system 20 includes one or more inertial sensors 26 and a controller 25, which are in operational association, for example, using a data bus 29. For ease of disclosure of the invention, the inertial sensor 26 will be an accelerometer, which is structured and arranged to measure linear acceleration and to provide acceleration waveform data.

The invention, however, is not to be construed as being limited thereto. Indeed, alternatively, the inertial sensor(s) 26 can also include two- or three-dimensional gyroscopes, two- or three-dimensional magnetic compasses, and the like. As is well known to those skilled in the art, gyroscopes can continuously measure angular velocity in one, two or three dimensions. Gyroscopes, further, can be structured and arranged to provide velocity data, especially zero velocity data, therefrom. As is well-known to the art, acceleration maxima occur at or near zero velocity.

Similarly, as is also well known, magnetic compasses, which measure the strength of the magnetic field of the Earth in up to three dimensions, can be used to measure the absolute angle of rotation of a device with respect to the Earth's magnetic field. Changes in the angle of rotation over time (de/dt) are indicia of angular velocity. Thus, magnetic compasses can be structured and arranged to provide this angular velocity data, especially zero velocity data, therefrom.

Accelerometers 26 are well known to the art and will not be described in detail. The inertial sensor/accelerometer 26 can be a three-dimensional or a two-dimensional sensor capable of measuring linear acceleration, i.e., the change in velocity with respect to time ($\Delta v/\Delta t$), of the optical or imaging device or system 24. In one aspect, the accelerometer 26 is an analog or a digital device that provides continuous analog or digital data that can be recorded and stored temporarily in memory, e.g., random access memory (RAM) 27, cache memory (not shown), and the like, to provide an acceleration waveform.

As is well known to the art, the instances of maximum acceleration correspond to the instances where linear (v) and angular ($\omega$) velocity are equal to zero. Hence, when linear acceleration is at a maximum, the optical or imaging device system 24 is substantially stationary and free of movement, which, to reduce the blurring effects of vibrations, is an ideal time to open and close the shutter 22.

Accordingly, the controller 25, which, typically, includes a microprocessor, is structured and arranged to receive and process acceleration data from the RAM 27 or, alternatively, if the controller 25 includes its own internal memory cache (not shown), to receive and process acceleration data directly from the accelerometer 26.

The controller 25 is, further, structured and arranged to process or otherwise to use this data to determine the amplitude and the frequency of the acceleration waveform such as shown in FIG. 1. Based on acceleration waveform frequency data, the controller 25 can predict the time between successive or future maximum, or peak, accelerations ($t_2-t_1$).

The controller 25 is also structured and arranged to provide a control signal to the shutter 22 of the optical or imaging system 24. In one aspect, in response to activation of the shutter release 21, the controller generates a signal to open and close the shutter 22 using the time prediction data and real-time acceleration data. More specifically, once the controller 25 detects or calculates another acceleration maximum (at time $t_1$), the controller 25 can generate the shuttering signal at time $t_2$ using the predicted time between successive or future maximum accelerations ($t_2-t_1$).

The controller 25 can include its own internal read-only memory (ROM) (not shown) or can use an external ROM 28. The ROM can include a plurality of applications, driving programs, algorithms, and the like to enable the controller 25 to perform the above.

Having described various systems and devices for providing high-quality images, a software or computer driving program will be described. In one aspect, the program includes source code for providing instructions to the inertial sensor to measure multi-directional acceleration of the device and to provide acceleration waveform data. The program also includes source code for calculating an acceleration amplitude and an acceleration frequency from the acceleration waveform data and, moreover, for predicting a time between maximum accelerations based on the acceleration frequency taken from the acceleration waveform data. Finally, the program includes sending opening and closing signals to the shutter after the shutter release has been activated. In one aspect, the opening and closing signal(s) is/are transmitted at a time corresponding to the predicted time between maximum accelerations as measured from a real-time acceleration amplitude maximum.

Figure 3:
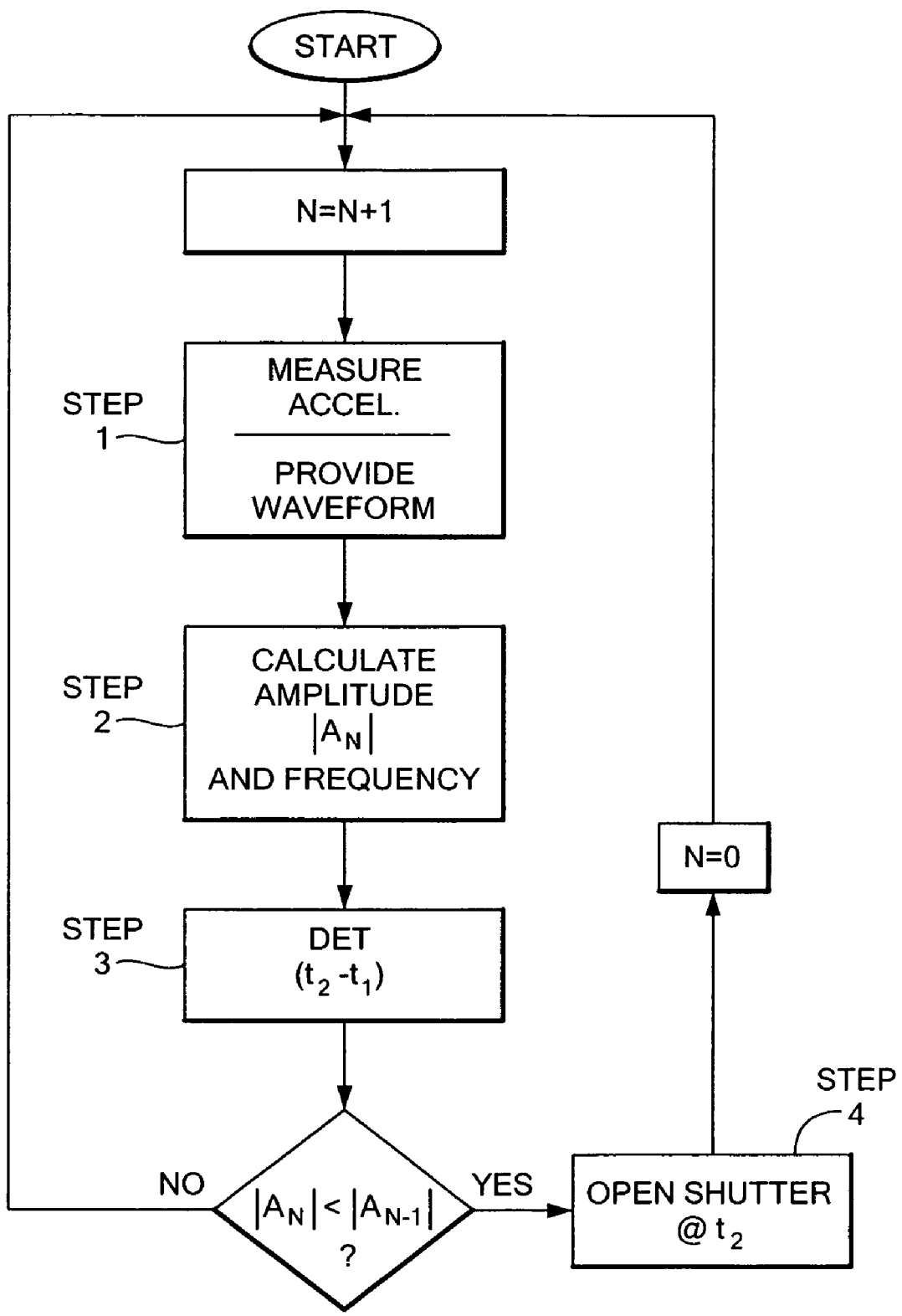
FIG. 3 shows a flow diagram of a process for controlling a shutter in accordance with the present invention.

Referring to FIG. 3, a method of providing high-quality images from an optical device or an imaging device by controlling the time of opening and closing the shutter will be described. The following steps occur after a user activates the shutter release to take an image of an object. In a first step, the optical device or imaging device can be provided with an inertial sensor, e.g., an accelerometer, to measure multi-directional acceleration of the device and to provide acceleration waveform data (STEP 1). These acceleration waveform data can be used to calculate an acceleration amplitude and an acceleration frequency (STEP 2) from which a time between maximum accelerations ($t_2-t_1$) can be predicted (STEP 3).

Having predicted a time between maximum accelerations (STEP 3), the inertial sensor can continue to measure multi-directional acceleration of the device, to provide acceleration waveform data (STEP 1), to identify acceleration amplitude, and to calculate acceleration frequency (STEP 2). When an acceleration amplitude ($A_N$) is less than the previous acceleration amplitude ($A_{N-1}$), then the previous acceleration amplitude was a maximum acceleration. As a result, the time for opening and closing the shutter (STEP 4), i.e., time $t_2$, can be measured from the time associated with the peak acceleration ($A_{N-1}$) at $t_1$ using the predicted time between maximum accelerations ($t_2-t_1$).

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What is claimed is:

1. A device for controlling opening and closing a shutter to an optical device or an imaging device, the control device comprising:
    an inertial sensor for measuring acceleration, velocity or angular rotation of the optical device or the imaging device and for providing data therefrom; and
    a controller for calculating an acceleration amplitude and an acceleration frequency from the data and for estimating a time between acceleration maximums;
    the controller being operative to open and close the shutter at a time corresponding to the estimated time between acceleration maximums ($t_2-t_1$) as measured from a real-time acceleration amplitude maximum.

2. The device as recited in claim 1, wherein the inertial sensor is selected from the group consisting of an accelerometer, a gyroscope, and a magnetic compass.

3. The device as recited in claim 2, wherein the inertial sensor is a two-dimensional sensor.

4. The device as recited in claim 2, wherein the inertial sensor is a three-dimensional sensor.

5. The device as recited in claim 2, wherein the accelerometer is operative to sense motion in the plane of the image sensor of the optical or imaging device.

6. The device as recited in claim 1, wherein the time between maximum accelerations is estimated from the acceleration frequency calculated from the data.

7. An optical device or an imaging device, having a shutter and a shutter release, for providing sharp, high-quality images, the optical or imaging device comprising:
   an inertial sensor for measuring acceleration, velocity or angular rotation of the optical or imaging device and for providing data therefrom; and
   a controller for calculating an acceleration amplitude and an acceleration frequency from the data and for estimating a time between acceleration maximums;
   the controller being operative to open and close the shutter at a time corresponding to the estimated time between maximum accelerations as measured from a real-time acceleration amplitude maximum.

8. The optical or imaging device as recited in claim 7, wherein the device is a still camera, video camera or a cellular telephone.

9. The optical or imaging device as recited in claim 7, wherein the inertial sensor is selected from the group consisting of an accelerometer, a gyroscope, and a magnetic compass.

10. The optical or imaging device as recited in claim 9, wherein the inertial sensor is a two-dimensional sensor.

11. The optical or imaging device as recited in claim 9, wherein the inertial sensor is a three-dimensional sensor.

12. The optical or imaging device as recited in claim 7, wherein the time between maximum accelerations is estimated from the acceleration frequency calculated from the data.

13. A method of providing high-quality images from an optical device or an imaging device, the optical or imaging device having a shutter and a shutter release, the method comprising:
   calculating an acceleration amplitude and an acceleration frequency from data provided by an inertial sensor in operative association with the optical device or the imaging device;
   estimating a time between acceleration maximums; and
   opening and closing the shutter after the shutter release has been activated at a time corresponding to the predicted time between maximum accelerations as measured from a real-time acceleration amplitude maximum.

14. The method as recited in claim 13, wherein the data are provided by the inertial sensor that is structured and arranged to measure multi-directional acceleration, velocity or angular rotation.

15. The method as recited in claim 14, wherein the inertial sensor provides the optical or imaging device with two- or three-dimensional data.

16. The method as recited in claim 13, wherein the time between maximum accelerations is predicted from the acceleration frequency calculated from the data.

17. A device for providing high-quality images from an optical device or an imaging device without post-imaging correction, the optical device or imaging device having a shutter, the device for providing high-quality images comprising:
   an inertial sensor for measuring acceleration, velocity or angular rotation of the optical device or imaging device and for providing data therefrom; and
   a controller for calculating an acceleration amplitude and an acceleration frequency from the data,
   the controller being operative to optimize image quality by opening and closing the shutter coincident with a period of zero or near zero displacement of the optical device or imaging device.

18. The device for providing high-quality images as recited in claim 17, wherein the controller is structured and arranged to estimate a time between acceleration maximums ($t_{max2}-t_{max1}$) using acceleration amplitude and acceleration frequency calculations.

19. The device for providing high-quality images as recited in claim 18, wherein the controller is structured and arranged to open and close the shutter, after activation of a shutter release, at a time corresponding to the estimated time between acceleration maximums ($t_{max2}-t_{max1}$) measured from detection of a real-time acceleration amplitude maximum.

20. The device for providing high-quality images as recited in claim 17, wherein the inertial sensor is selected from the group consisting of an accelerometer, a gyroscope, and a magnetic compass.

* * * * *